United States Patent

[11] 3,614,268

[72] Inventor Adrien Merenda
 Clarens, Switzerland
[21] Appl. No. 865,659
[22] Filed Oct. 13, 1969
[45] Patented Oct. 19, 1971
[73] Assignee Ateliers de Constructions Mecaniques de Vevey S.A.
 Vevey (Vaud), Switzerland
[32] Priority Apr. 24, 1969
[33] Switzerland
[31] 6,213/69

[54] HYDRO-ELECTRIC INSTALLATION
 9 Claims, 1 Drawing Fig.
[52] U.S. Cl. ................................................ 417/237,
 290/52, 415/500
[51] Int. Cl. ......................................................F04b 41/04,
 H02k 7/18, F01d 15/10
[50] Field of Search............................................ 417/237,
 410, 411, 423, 424, 22; 290/52; 415/500, 47

[56] References Cited
 UNITED STATES PATENTS
1,047,557 12/1912 Owens............................ 417/22 X
2,246,472 6/1941 Sharp............................ 290/52
2,962,599 11/1960 Pirkey............................ 415/500 X
3,372,645 3/1968 Willi............................. 415/500 X Primary Examiner—Carlton R. Croyle
Assistant Examiner—Richard E. Gluck
Attorneys—Emory L. Groff and Emory L. Groff, Jr.

ABSTRACT: A hydroelectric installation, comprising a hydraulic machine, such as a turbine, pump or pump turbine, wherein the rotor is coupled to the shaft of a synchronous alternating current electrical machine operating as an alternator, or as a motor. When operating as a turbine, the installation includes at least one set of rectifiers transforming the alternating current produced by the alternator into direct current. When operating as a pump, the installation includes at least one undulator transforming the direct current supplied by the electric line into alternating current and supplying the motor. In both instances the installation comprises a pilot device controlling the mechanism regulating the quantity of water flowing through the turbine, or the frequency of the current output of the undulator to maintain at any instant, the predetermined speed of rotation of the rotor of the machine regardless of the value of the hydraulic head existing at that moment.

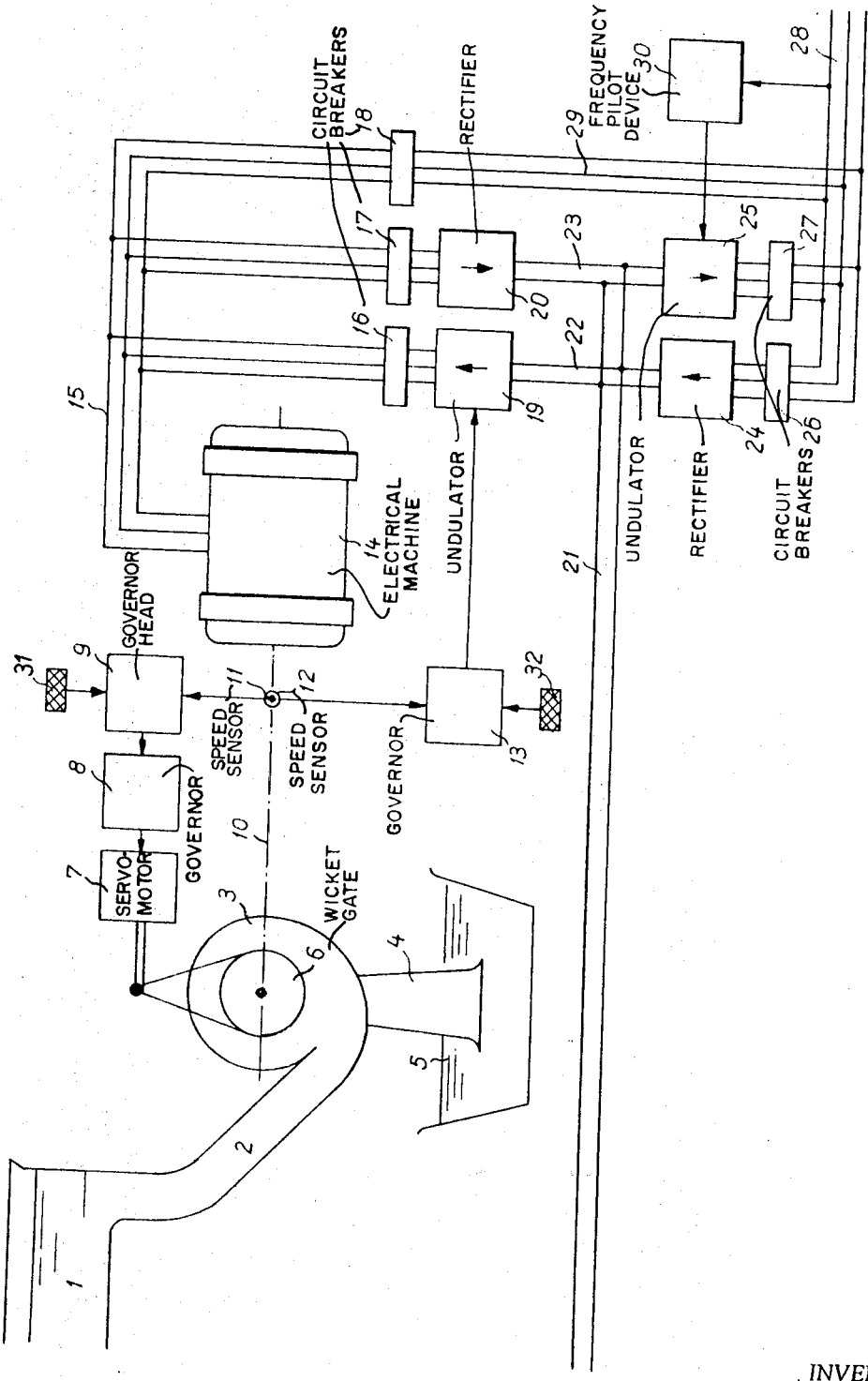

HYDRO-ELECTRIC INSTALLATION

In most hydroelectric installations including an upper reservoir of water, the level of the water often varies causing modifications in the head, which are important, even when expressed in relative values in relation to the head itself. For a given machine, such as a turbine, pump or pump turbine rotating at a given speed, the hydraulic efficiency depends to a great extent on the height of the head, the variations of which are often very important. The loss of production due to a fall in the hydraulic efficiency of the machine is also very important. It is therefore expedient to take all possible measures in order that the machine operates with a good hydraulic efficiency in spite of the natural variations of the head.

Various solutions have been applied tending to attain this result. It is fairly common, for example, to construct electrical machines, motors or generators, synchronous, three-phase, made in such a way as to be able to rotate at at least two different speeds despite the fact that the alternating current supply is at constant frequency. Thus, to each of the speeds of rotation corresponds a different value of the head for which the hydraulic efficiency is optimum. With such a machine it is sufficient to choose the speed of rotation of the hydroelectric unit which corresponds best to the hydraulic head existing at the moment considered. The production of such an electrical machine is, however, difficult and the extremely limited number of speeds of rotation possible, generally only two, are insufficient in most cases and especially in all cases where the relative variations of the head are important.

The object of the present invention concerns the production of hydroelectric machines capable of rotating at all the necessary speeds, permitting maintenance at all times of the optimum efficiency of the installation regardless of the value of the hydraulic head being considered. In other words, it concerns a hydroelectric installation connected to at least one direct current electrical line, in which the head is submitted to appreciable variations, comprising a hydraulic machine, such as a turbine, pump or pump turbine, of which the rotor is coupled to the shaft of a synchronous alternating current electrical machine operating as an alternator or as a motor. The installation comprises further, when operating as a turbine, at least one set of rectifiers transforming the alternating current produced by the alternator into direct current and when operating as a pump, at least one undulator transforming the direct current supplied by the electric line into alternating current and supplying the motor, characterized in that the installation includes a pilot device controlling the mechanism regulating the quantity of water flowing through the turbine, or the frequency of the current output of the undulator to adapt, at any instant, the speed of rotation of the rotor of the machine as a function of the value of the hydraulic head existing at that moment, the speed chosen in such a way that the efficiency of the machine remains appreciably at its optimum value despite the variations of head.

Another object of the present invention concerns reversible machines such as pump turbines which, in addition to the natural variations of the head are submitted to other variations according to the way in which they operate. When a hydraulic machine operates as a turbine, the net head at disposal between the inlet and the outlet of the turbine is equal to the gross head less the losses due to the friction of the water in the pipeline. On the other hand, when the machine works as a pump it must supply a pressure equal to the gross head increased by the pressure losses of the water in the pipeline. Thus, for the same natural head, the head at disposal for the operation of the turbine is different from the pumped head to be supplied when the machine is in service as a pump. The difference is roughly equal to the double of the sum of the losses in all of the pipelines.

The relationships connecting the speed of rotation and the head in a hydraulic machine are known. It is also generally known that the faster a pump turns the higher the head which can be delivered. It is this property that is utilized in the present invention.

However, the realization of an electrical machine with a good efficiency, of high power, supplied by or supplying a high-voltage line capable of working over a whole range of speeds of rotation and finally not necessitating excessive maintenance is not yet possible. However, by employing a synchronous electrical machine, conventional motor or alternator, the objective sought can be attained. In fact the progress made recently in the construction of current rectifiers, transforming alternating current into direct current and in the construction of undulators carrying out the reverse, that is transforming direct current into alternating current, allow the consideration of the use of such elements which are economical and dependable even for very high voltages and for high powers. In intercalating such apparatus, that is a rectifier and an undulator between a synchronous alternating current electrical machine and an alternating current network, this amounts to decoupling the frequencies, that of the machine being able to be different from that of the network. The electrical connection serves only for the passage of the power, that is of the energy, so there is no longer a synchronization of the machine and the network. This decoupling of the frequencies thus permits the hydroelectric machine to rotate at a speed different from that which would be imposed by synchronization with the network and especially at the best speed, that is to say, at a speed permitting the maintenance of the optimum efficiency despite the variations of head which could occur.

The sole FIGURE included herewith represents schematically and as an example one form of execution of the installation. This hydroelectric installation is composed of the following principal elements:

2. upper storage reservoir;
2. supply pipeline in the case of operation as a turbine: delivery pipeline in the case of operation as a pump;
3. the hydraulic machine: turbine, pump or pump turbine;
4. suction pipe;
5. reservoir: of restitution in the case of operation as a turbine, and of intake (suction) in the case of operation as a pump;
6. wicket gate mechanism, apparatus regulating the discharge of the turbine;
7. servomotor for operation of the wicket gate mechanism;
8. governor;
9. governor head elaborating a correcting signal in function of the difference between the real speed of the rotor of the unit and the desired speed;
10. shaft connecting the hydraulic and electrical machines;
11. device measuring the speed (operation as a turbine);
12. device measuring the speed (operation as a pump);
13. governor, operation as a pump, elaborating a correcting signal in function of the difference between the real frequency of the alternating current connecting line 15 and the desired frequency;
14. electrical machine: alternator, or synchronous motor;
15. alternating current electric connecting line;
16. three circuit breakers;
17. three circuit breakers;
18. three circuit breakers;
19. unit undulator;
20. unit rectifier;
21. three direct current electric power lines;
22. three direct current electric power lines;
23. three direct current electric power lines;
24. network rectifier;
25. network undulator;
26. two circuit breakers;
27. two circuit breakers;
28. alternating current network;
29. direct alternating current line;
30. pilot device of the network undulator 25;
31. control device allowing the introduction of a signal of regulation of the desired speed;
32. control device allowing the introduction of a signal of regulation of the desired frequency.

The operation of the installation is as follows:

Suppose that the machine is in operation as a turbine: the water contained in the reservoir 1 supplies, via the pipeline 2, the turbine 3, which it leaves via the suction pipe 4 which returns it to the lower reservoir 5. The quantity of water is controlled by the position occupied by the wicket gate mechanism 6. The energy produced by the turbine which drives, by means of the shaft 10, the rotor of the synchronous alternator 14 leaves by means of the electrical distribution line 15. The circuit breaker 17 is closed whereas the circuit breakers 16 and 18 are open. This energy then passes through the rectifier 20 which transforms the alternating current into direct current and supplies the direct current distribution network 21.

Installations for the transport of energy at high voltage and over very great distances, in the form of direct current, are today more and more numerous because, with this form of current, the line losses are greatly reduced in comparison with those existing in a line transporting alternating current. Moreover, it is equally possible to utilize this energy, which is in the form of direct current, and to consume it in the form of alternating current as is the case for the great majority of the actual uses. To this effect, it suffices to close the circuit breaker 27, leaving 26 open which puts into service the network undulator 25 which transforms the direct current output from the unit rectifier 20 into alternating current. The installation may comprise a supplementary pilot device 30 controlling the network undulator 25 in such a way that the frequency which said undulator delivers is precisely equal to the frequency of the network 28.

By this arrangement, it will be noted that the frequencies of the networks 28 and 15 may be different to each other, even to a great extent.

The governor head 9 measures the speed of the unit by means of the speed-sensing device 11 and operates, by means of the governor 8 and the servomotor 7, the wicket gate mechanism 6 in such a way that the rotational speed of the rotor of the unit, shaft 10, be exactly equal to the speed corresponding to the maximum efficiency of the machine taking into account the head existing at the moment considered. It is understood that this speed varies when the head varies and can be adapted more or less continuously according to the particular case.

Generally speaking, the speed of change of the head is very low because it is appreciably equal to the speed of change of the level of water in the reservoir. The greater part of the time a manual control by means of the device 31 is sufficient. However, this operation can be automated by making the value of the head act on the device 31, thus continuously adapting the desired speed of the unit to the variations of the head. The control circuit 7, 8, 9 intervenes continuously in order that the actual speed remains equal to the desired speed.

In the case of operation as a pump, the circuit breakers 17, 18 and 27 are open whereas the circuit breaker 16 is closed. The energy coming from either a direct current distribution line 21 or from the alternating current network 28, passing via the intermediary of the circuit breaker 26, also closed, and the network rectifier 24 supplies, via the undulator 19, the electrical machine 14. The installation comprises further a regulating device 13 influencing the undulator 19 in such a way that the frequency of the electrical current delivered by the apparatus is regulated as a function of the frequency desired, precisely, of the head, and this in the same manner as the speed governor head 9, in the case of operation as a turbine. The speed of rotation of the unit is directly connected, for a synchronous electrical machine, to the frequency of the supply current 15. To fix the speed of rotation of the shaft 10 of the pump it is sufficient to pilot the frequency of the output of the undulator 19. The governor 13 receives from the speed-measuring device 12 a signal of actual frequency and from the control device 32 a signal of the desired frequency. It elaborates a correcting signal which is a function of their difference and controls the frequency of the undulator in such a way that the speed of rotation of the pump be the best possible, taking into account the value of the head to be supplied.

The pump turning at its correct speed sucks water from the lower reservoir 5 and discharges it via the pipeline 2 into the upper reservoir 1.

As in the case of operation as a turbine, the system can be automated, the head intervening directly on the governor 13 to modify the frequency of the output of the undulator.

The schematic drawing illustrates further the possibility of obtaining a direct connection by means of the line 29 and the circuit breaker 18 allowing, if necessary, the direct connection of the electrical machine 14 to the network in the case where the rotational speed of the shaft allowing the optimum efficiency of the hydraulic machine is precisely equal to the speed of this shaft if it were directly synchronized on the network. The two networks are connected to each other by means of the circuit breaker 18 and the line 19, the other circuit breakers 16 and 17, 26 and 27 being open.

The operation of a pump turbine is identical, according to the case, to the one or the other of the two types of operation described.

The above description mentions the case of alternating current machines and networks; it is clear that it could be single- three- or polyphase current which is being considered. In the same way one could realize electrical machines having a number of phases different to the network and notably a higher number, that which improves appreciably the operation of the rectifiers.

I claim:

1. A hydroelectric installation connected to at least one direct current electric line in which the hydraulic head is subject to appreciable variations, comprising a pump turbine including a rotor, a synchronous alternating current electrical machine operating as an alternator or as a motor, said machine including a shaft, means operatively connecting said rotor to said shaft, at least one set of rectifiers transforming the alternating current produced by the alternator into direct current when the pump turbine is operating as a turbine, at least one undulator transforming the direct current supplied by the electric line into alternating current and supplying the motor when the pump turbine is operating as a pump, control means for regulating the discharge of water through the pump turbine when operating as a turbine, said control means further regulating the frequency of the current output of the undulator when the pump turbine is operating as a pump, said control means including means sensing the speed of rotation of said rotor-to-shaft connecting means, whereby said connecting means is maintained at a predetermined speed of rotation regardless of variations of the hydraulic head.

2. An installation according to claim 1, wherein said direct current electric line is supplied with energy from an alternating current electrical network including at least one set of rectifiers and at least one undulator acting on said direct current electric line to supply with energy an alternating current electrical network.

3. An installation according to claim 1, wherein said hydroelectric machine and said set of rectifiers supplying the energy to the direct current electric line are situated in the same geographical place.

4. An installation according to claim 2, wherein said hydroelectric machine and said set of rectifiers supplying the energy to the direct current electric line are situated in the same geographical place.

5. An installation according to claim 1, wherein said alternating current electrical machine is polyphase.

6. An installation according to claim 2, wherein said alternating current electrical network supplying the direct current electric line with energy through the set of rectifiers, is polyphase.

7. An installation according to claim 1, wherein the number of phases of the electrical network supplying said direct current electric line with energy is different from the number of phases of said alternating current electrical machine.

8. An installation according to claim 5, wherein the number of phases of the electrical network supplying said direct current electric line with energy is different from the number of phases of said alternating current electrical machine.

9. An installation according to claim 6, wherein the number of phases of the electrical network supplying said direct current electric line with energy is different from the number of phases of said alternating current electrical machine.